United States Patent [19]

Läufe et al.

[11] Patent Number: 5,299,009

[45] Date of Patent: Mar. 29, 1994

[54] AMPLIFIER WITH A TUNED OUTPUT TRANSFORMER

[75] Inventors: Martin Läufe; Fritz Ohnemus, both of Villingen-Schwenningen, Fed. Rep. of Germany

[73] Assignee: Deutsche Thomson-Brandt GmbH, Villingen-Schwenningen, Fed. Rep. of Germany

[21] Appl. No.: 914,726

[22] Filed: Jul. 17, 1992

Related U.S. Application Data

[63] Continuation of PCT/EP90/02144, Dec. 11, 1990.

[30] Foreign Application Priority Data

Dec. 23, 1989 [DE] Fed. Rep. of Germany ....... 3942908

[51] Int. Cl.$^5$ .............................................. H04N 3/23
[52] U.S. Cl. .................... 348/707; 348/806
[58] Field of Search .............. 315/371, 370, 389, 387; 358/188, 160, 148, 158, 242; H04N 3/233, 3/233, 3/237, 3/223, 3/22

[56] References Cited

U.S. PATENT DOCUMENTS 4,625,154 11/1986 Willis .................................. 315/371
4,682,085 7/1987 Haferl et al. ......................... 315/371
4,968,920 11/1990 Hartmann et al. .................... 315/371

FOREIGN PATENT DOCUMENTS 0201336 11/1986 European Pat. Off. .
0284348 9/1988 European Pat. Off. .
0003663 1/1992 Japan .
0000170 1/1986 PCT Int'l Appl. .

*Primary Examiner*—James J. Groody
*Assistant Examiner*—David E. Harvey
*Attorney, Agent, or Firm*—Joseph S. Tripoli; Daniel E. Sragow

[57] ABSTRACT

A reverse feedback amplifier which generates a correction current having two oscillations per line period is used to eliminate geometric distortions on the screen on a television kinescope. The reverse feedback amplifier includes an output transistor, a resonance transformer and a feedback network. An improvement of the amplifier includes a switch and a resistor for decreasing the output voltage of the reverse feedback amplifier during the scanning of the center portion of the screen.

4 Claims, 3 Drawing Sheets

AMPLIFIER WITH A TUNED OUTPUT TRANSFORMER

This is a continuation of PCT application PCT/EP 90/02144 filed Dec. 11, 1990 by Martin Laufer and Fritz Ohnemus and titled "Amplifier With A Tuned Output Transformer".

This invention is directed to an amplifier with a tuned output transformer. In television picture tubes (kinescopes), and particularly large format kinescopes, several geometric distortions occur in the scanned picture display (raster). With large format rectangular tubes, for example, a geometric distortion in the north/south direction occurs. This distortion is manifested in the form of parabolic curvatures of the horizontal lines which are directed towards the horizontal center line of the screen. This distortion is greatest at the upper and lower picture edges and decreases continually towards the horizontal center line of the screen.

Another geometric distortion manifests itself as a curvature of the horizontal lines in the shape of two cosine oscillations during one line period. This distortion is therefore referred to as "gullwing" distortion. The gullwing distortion appears in the upper half and the lower half of the picture screen. The guilwing distortion can be eliminated by a correction current with double line frequency and which is generated by a modulator circuit. However, correcting the gullwing distortion often results in a different distortion which is frequently called "bending" distortion. In bending distortion the portions of the horizontal lines at the right and left picture edges are bent away from the top and bottom edges of the tube toward the picture center, that is downwardly in the upper picture half and upwardly in the lower picture half. This bending distortion appears in the same area as the gullwing distortion. An older application (P 38 14 563.4) describes a circuit arrangement for eliminating the bending distortion. However, the technique described therein requires a substantial expenditure in circuitry. The invention is directed to a circuit which eliminates bending distortion using simple means.

Figure 1A:
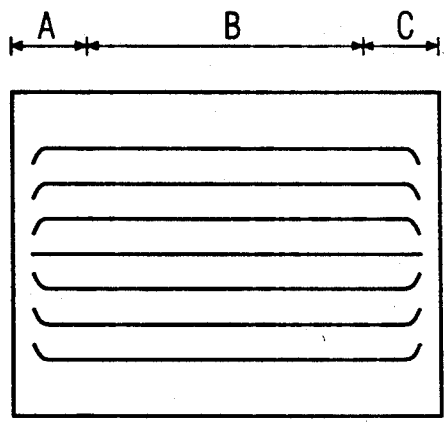
FIGS. 1a to 1c show the various geometric distortions typical with large Kinescopes.
Figure 1B:
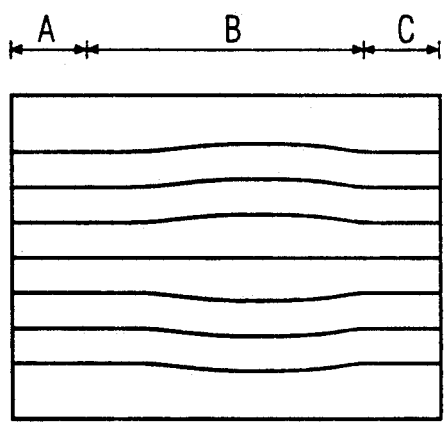
Figure 1C:
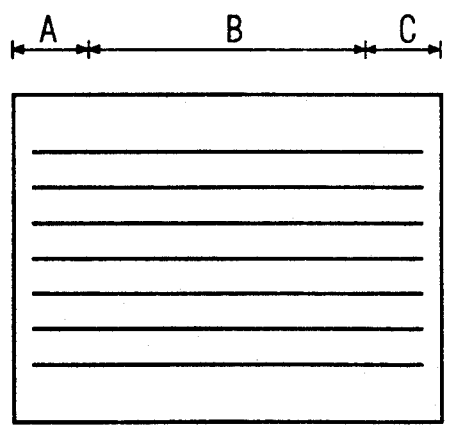

In FIG. 1a, the bending distortion illustrated is that which results after the gullwing correction described above has been made. The end portions of the scanned horizontal lines which lie in the areas A and C are curved away from the horizontal edges of the tube toward the center line of the tube. An effort to correct this distortion by increasing the gullwing correction will result in over-compensation in the center area B of the tube, as shown in FIG. 1b. With the invention the over-compensation in center area B is reduced by attenuating the gullwing correction current and as a result the line is straight in center area B, as shown in FIGURE 1c. Accordingly, the object of the invention is to provide a circuit which eliminates compensation in the center area B.

As is known in the art, north/south correction circuits utilize tuned transformers to save power and to make the geometric distortion correction symmetric for the fight and left sides of the tube. A tuned output circuit, results in problems when very rapid changes in amplitude must be transformed, which is exactly the case when eliminating the bending distortion. Thus, after the area A gullwing correction has been completed, the current must be very quickly decreased for the area B correction. The decrease must be made during one line duration of 64 microseconds. Also, after the correction in area B is complete, the current must be very rapidly increased to the original value in order to effect the area C correction. However, needed the rapid current changes are not possible when the correction current is changed through appropriate modulation of the input signal provided to the gullwing correction circuit. This is so because the energy stored by the oscillation circuit causes the amplitudes of the oscillations to decay and build up relatively slowly.

Figure 2:
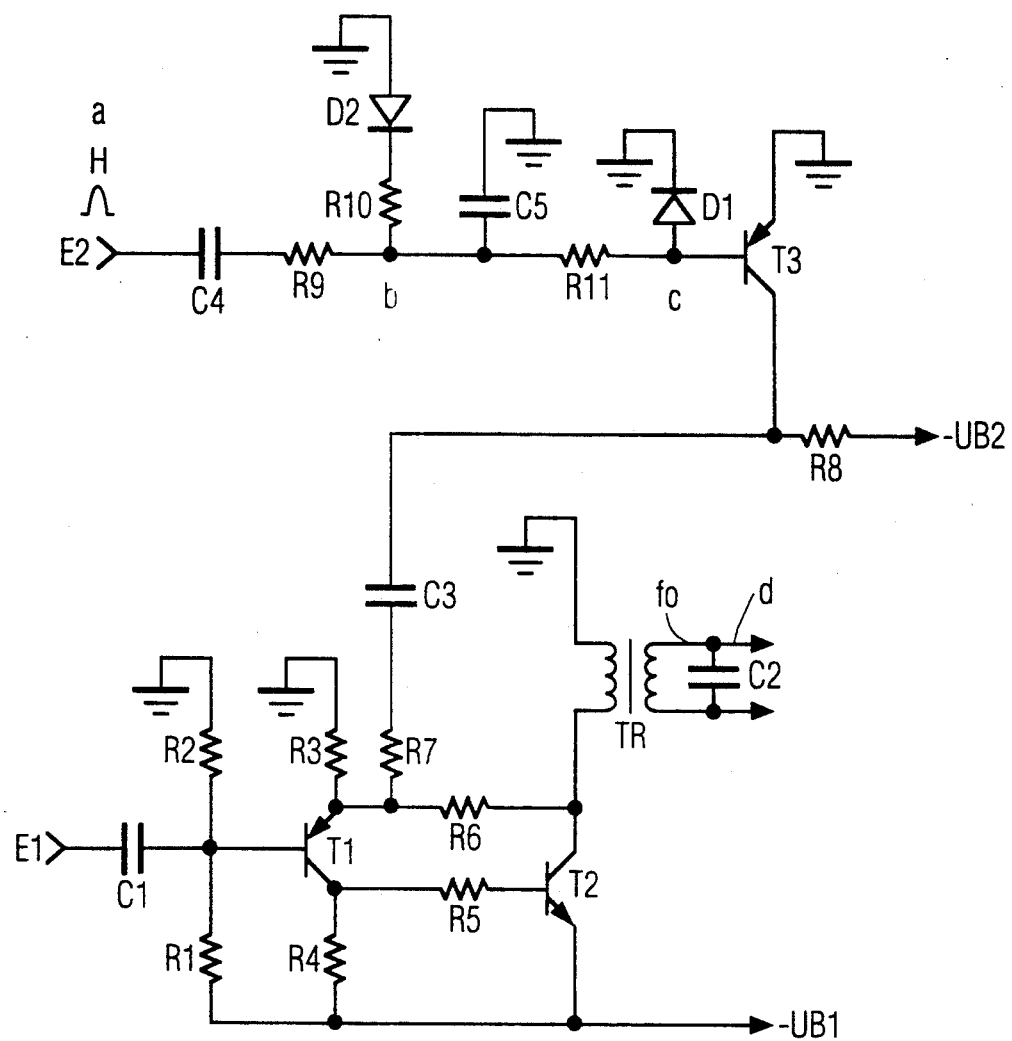
FIG. 2 is a preferred embodiment.

The invention is described as a modification to an existing gullwing correction circuit with reference to FIG. 2 in conjunction with the waveforms shown in FIG. 3. The portion of the circuit shown in FIG. 2 which is a prior art gullwing correction circuit is described first. The input terminal E1 of a reverse (negative) feedback amplifier circuit provides the correction signal to an input transistor T1, via a coupling capacitor C1. For the purpose of setting the operating point of the amplifier, the base of an input transistor T1 is biased across a voltage divider formed by two resistors R1 and R2. The collector-emitter junction of transistor T1 is connected between the operating voltage source—UB1 and ground by resistors R3 and R4. The emitter of the input transistor T1 is clamped across the base resistor R3 of the reverse feedback network R6, R3 to ground potential, the collector is connected via the load resistor R4 to the operating voltage—UB1. The signal is applied to the base of the output transistor T2 via the load resistor R5. The emitter of transistor T2 is coupled to the operating voltage source UB1. The collector of transistor T2 is coupled to ground via the primary winding of a resonance transformer TR. The gullwing distortion correction signal is available at the secondary winding of transformer TR. The collector of the output transistor T2 is connected, via a feed-in resistor R6 of the reverse feedback network R6, R3, to the emitter of the input transistor T1. This is a known reverse feedback circuit. The resonance transformer TR is tuned to double horizontal (line) frequency $2fz = fo$, for example, by means of the capacitor C2.

Figure 3A:
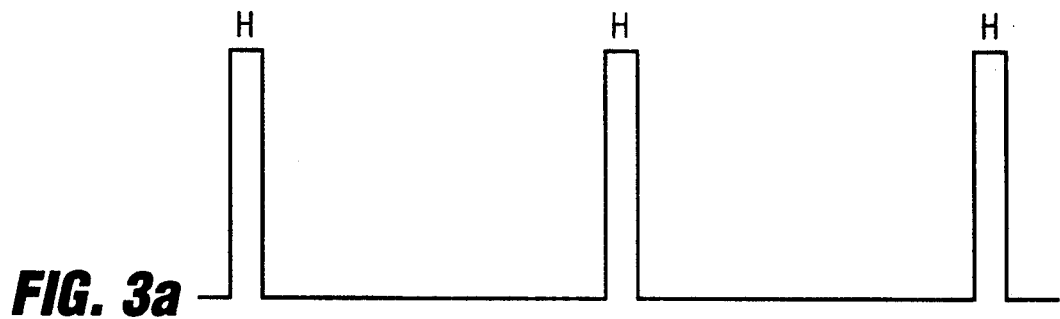
FIGS. 3a-3d, shows the signals present at various locations indicated in the FIG. 2 embodiment.
Figure 3B:
Figure 3C:
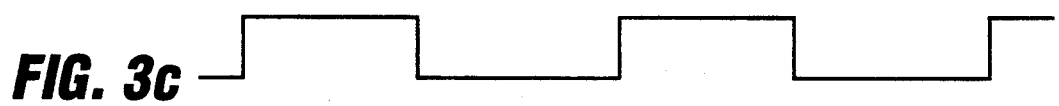
Figure 3D:
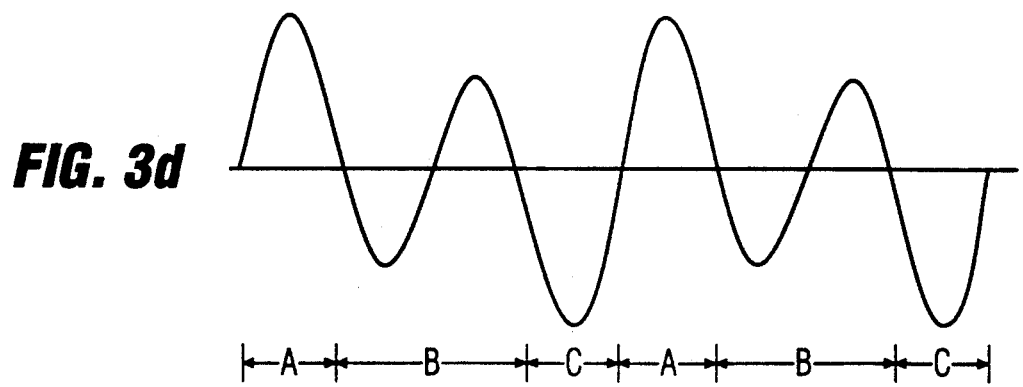

The gullwing distortion correction circuit described thus far is improved by the invention. A switching transistor T3, the emitter of which is clamped to ground potential connects a resistor R7 and a capacitor C3 in parallel to the base resistor R3 at a suitable point in time. The coupling capacitor C3 appears as a short circuit to alternating current and serves merely to block the operating voltage—UB2, which is connected to the collector of the switching transistor T3 via the resistor R8. By triggering of the switch transistor T3 on during the scanning in area B, the reverse feedback of the gullwing distortion correction amplifier is changed and the correction current during scanning in area B of FIG. 1 is reduced. The correction current is reduced during the second half of the first of the gullwing cycle and during the first half of the second gullwing cycle, both of these cycles occur during the area B scanning. Thus, the correction current is reduced during the scanning of approximately the center one-third of the picture tube screen. The increased reverse feedback means that the inner resistance of the amplifier is reduced and accordingly, the oscillation circuit consisting of the winding of the transformer TR and the capacitor C2 is subjected to a higher attenuation. The output voltage of the circuit is thus reduced at this time, as is ezpected of reverse feedback circuits. The input terminal E2 of the inventive circuit receives the horizontal frequency pulse H (FIG. 3a), via the coupling capacitor C4. This pulse is converted into a sawtooth-shaped signal by means of the resistor R9 and the capacitor C5 (FIG. 3b). The series combination of the resistor R10 and the diode D2, which is coupled to the integrator formed by resistor R9 and capacitor C5, serves as a clamping circuit and thereby influences the width of the triggering pulses (FIG. 3c) which are applied via the resistor R11 to the base of the switching transistor T3. The limiting effect of diode D1 on the base-emitter voltage serves as protection for transistor T3. The triggering of switching transistor T3 must take place such that it increases the reverse feedback during scanning in area B, that is it is switched to be non-conducting. Because of the inductive load on the output transistor T2 the triggering voltage for the switching transistor T3 must be offset in phase by 90 degrees in relation to the correction current. With the invention, the effective correction current is reduced for the duration of the increased reverse feedback. In the preferred embodiment shown, the reverse feedback is attained by switching off the parallel resistor R7. The reverse feedback can also be increased in that a series resistor can be added to the emitter resistor R3. FIG. 2d shows the influencing effect of the correction current generated by the circuit.

A circuit arrangement in accordance with the invention was dimensioned as shown in the following table:

| R1: | 470 kOhm | C1: | 10 nF | D1: 1N4148 |
|---|---|---|---|---|
| R2: | 22 kOhm | C2: | 0.1 uF | D2: 1N4148 |
| R3: | 680 Ohm | C3: | 1 uF | |
| R4: | 2.2 kOhm | C4: | 10 nF | T1: BC 557 |
| R5: | 1 kOhm | C5: | 1 nF | T2: BD 137 |
| R6: | 6.8 kOhm | | | T3: BC 557 |
| R7: | 330 Ohm | | | |
| R8: | 15 kOhm | | | |
| R9: | 47 kOhm | | | |
| R10: | 47 kOhm | | | UB1: −25 V |
| R11: | 47 kOhm | | | UB2: −15 V |

We claim:

1. In a reverse feedback amplifier which generates a correction current having two oscillations per line period for eliminating geometric distortions on the screen of a television kinescope, said reverse feedback amplifier including an output transistor, a resonance transformer and a feedback network, an improvement comprising:
   means for decreasing the output voltage of said reverse feedback amplifier during the scanning of the center portion of said screen.

2. The improvement of claim 1 wherein said output voltage is decreased during the second half of the first oscillation and the first half of the second oscillation of said correction current.

3. The improvement of claim 2 wherein said means for decreasing includes an impedance and switch means for selectively connecting said impedance into said feedback network to change the impedance of said feedback network during the second half of said first oscillation and during the first of half of said second oscillation.

4. The improvement of claim 3 wherein said impedance includes a resistor and said switch means includes a transistor for connecting said resistor in parallel with a feedback resistor of said reverse feedback amplifier.

* * * * *